United States Patent [19]
Yasuhara

[11] 4,432,331
[45] Feb. 21, 1984

[54] ENGINE CONTROL SYSTEM

[75] Inventor: Seishi Yasuhara, Yokosuka, Japan

[73] Assignee: Nissan Motor Company, Limited, Yokohama, Japan

[21] Appl. No.: 390,687

[22] Filed: Jun. 21, 1982

[30] Foreign Application Priority Data

Jun. 30, 1981 [JP] Japan ................................ 56-101841

[51] Int. Cl.³ ........................................... F02M 25/06
[52] U.S. Cl. ............................... 123/571; 364/431.03; 364/431.06; 364/431.12
[58] Field of Search ............... 123/571, 486, 479, 352, 123/415, 416, 417; 364/431.03, 431.06, 431.12, 431

[56] References Cited

U.S. PATENT DOCUMENTS

| 4,181,944 | 1/1980 | Yamauchi et al. | 364/431 |
| 4,257,382 | 4/1981 | Matsui et al. | 123/571 |
| 4,276,866 | 7/1981 | Higashiyama | 123/571 |
| 4,347,570 | 8/1982 | Ariyama et al. | 123/571 |
| 4,385,616 | 5/1983 | Korayashi et al. | 123/571 |
| 4,390,001 | 6/1983 | Fujimoto | 123/571 |

Primary Examiner—Wendell E. Burns
Attorney, Agent, or Firm—Schwartz, Jeffery, Schwaab, Mack, Blumenthal & Koch

[57] ABSTRACT

An engine control system having a feedback control circuit for providing a correction factor corresponding to a deviation between actual and target values of at least one condition to be controlled. The feedback control circuit includes a memory with a potentiometer having a resistor and a wiper movable in sliding contact with the resistor. A reversible motor is drivingly connected to the wiper for moving the wiper on the resistor. There is provided a motor drive circuit for rotating the reversible motor in one or reverse direction in accordance with the deviation so as to permit the wiper to tap off a resistance corresponding to the deviation.

17 Claims, 5 Drawing Figures

4,432,331

ENGINE CONTROL SYSTEM

BACKGROUND OF THE INVENTION

This invention relates to an engine control system responsive to engine operating parameters for determining a target value of setting of a controlled variable to obtain an optimum value of a condition for efffecting a predetermined function of an internal combustion engine and, more particularly, to such an engine control system having a feedback control circuit for correcting the target value for a deviation between the optimum and actual values.

There has been an increasing need for employing microcomputers in engine control systems for more accurately controlling one or more functions of an internal combustion engine. Such a microcomputer calculates target values of settings of controlled variables such as fuel-injection timing, EGR-valve position, ignition-system spark-timing, and the like and corrects each of the calculated target value for a correction factor corresponding to a deviation between the calculated target value and sensed actual value for the controlled variable. The correction factors are stored in a computer memory such as a random access memory (RAM).

For example, with respect to the controlled-variable EGR-valve position, which determines the amount of engine exhaust gases recirculated to the combustion chambers of the engine, a target value is calculated to obtain an optimum EGR rate in relation to engine speed and engine load. In order to correct the target value for changes with the passage of time due to carbon accumulated in the EGR system, a correction factor is obtained in accordance with a deviation between the target EGR rate value and an actual EGR rate value sensed by a suitable sensor. It is necessary to store the correction factor in the computer memory or use just after the engine, which is stalled once, is restarted. However, the correction factor stored in the computer memory will be erased when the computer memory is separated from a source of power.

It is the normal practice to maintain the data stored in a computer memory by using a circuit for maintaining the computer memory connected to a vehicle battery. However, the vehicle battery is required to be detached during vehicle repair or long parking so that the stored data will be erased. Alternatively, a nonvolatile RAM may be used to store the correction factor. However, this results in an expensive engine control system.

The present invention provides an engine control system having a memory which includes a potentiometer and a reversible motor drivingly connected to the potentiometer to tap off a resistance corresponding to a value to be stored in the memory. Thus, the stored value is maintained after the memory is separated from a source of power.

SUMMARY OF THE INVENTION

There is provided, in accordance with the present invention, an engine control system responsive to engine operating parameters for determining a target value of setting of at least one controlled variable to obtain an optimum value of a condition for effecting a predetermined function of an internal combustion engine. The engine control system includes a sensor associated with the engine for sensing an actual value of the condition, a comparator for detecting a difference between the actual value and the optimum value, a memory for storing a correction factor corresponding to the detected difference, and means for correcting the target value for the stored correction factor. The memory includes a potentiometer having a resistor and a wiper movable in sliding contact with the resistor. A reversible motor is drivingly connected to the wiper for moving the wiper on the resistor. A motor dirve circuit is provided for rotating the reversible motor in one or reverse direction in accordance with the detected difference so as to permit the wiper to tap off a resistance corresponding to the detected difference.

The motor drive circuit rotates the reversible motor in one direction when the detected difference is positive and in the reverse direction when the detected difference is negative. The motor drive circuit may be designed to rotate the reversible motor an angle corresponding to the detected difference. Alternatively, the motor drive circuit may be constructed to rotate the reversible motor by a predetermined number of degrees at intervals.

BRIEF DESCRIPTION OF THE DRAWINGS

The details as well as other features and advantages of this invention are set forth below and are shown in the accompanying drawings, in which.

DESCRIPTION OF THE PREFERRED EMBODIMENTS

Figure 1:
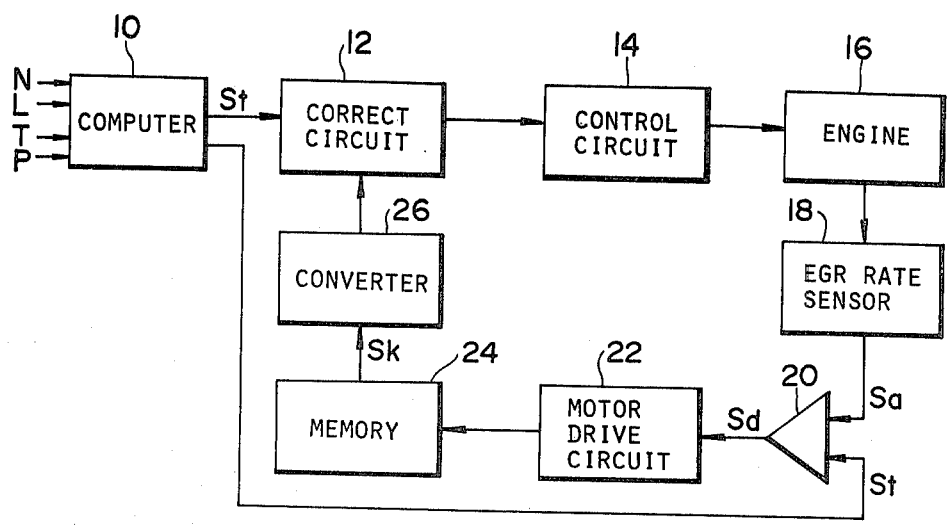
FIG. 1 is a schematic block diagram showing one embodiment of an engine control system made in accordance with the present invention.

FIG. 1 illustrates one embodiment of an engine control system made in accordance with the present invention. While in the examplification of the invention an EGR rate control circuit is illustrated, it is understood that the controlled variables, that is, the adjustable variables selected to control or determine the characteristics of the engine operation, may be fuel-injection timing, ignition-system spark-timing, and the like.

Referring to FIG. 1, it will be seen that reference numeral 10 designates a computer which calculates a target value t of EGR rate in relation to engine operating parameters including engine speed N, engine load L, engine temperature T, barometric pressure P, and the like. The computer 10 generates at its output a signal St corresponding to the calculated target value t. The signal St is fed through a correcting circuit 12 to a control circuit 14. The correction circuit 12 corrects the target value t for a correction factor K which is determined based upon a deviation between the target and actual EGR rate values caused by EGR system manufacturing and assembling errors, accumulated carbon in the EGR system, or the like. The control circuit 14 controls the EGR rate, for example, by adjusting the position of an EGR valve incorporated in an internal combustion engine 16.

There is provided an EGR rate sensor 18 which senses the actual value a of EGR rate and generates at its output a signal Sa corresponding to the sensed actual EGR rate value a. The signal Sa is applied to one input of a comparator 20 which also receives at another input the signal St from the computer 10. The comparator 20 generates at its output a signal Sd having a magnitude d corresponding to the absolute value of the difference $d = a - t$ between the actual and target EGR rate values. The signal Sd has a positive sign when the difference d is larger than $\alpha$ and a negative sign when the difference d is smaller than $-\alpha$, wherein $\alpha$ is a positive value including zero and is determined by the allowable error range for EGR rate control. The magnitude of the signal SD is zero if the absolute value of the difference d is equal to or smaller than $\alpha$. The signal is then applied to a motor drive circuit 22 associated with a memory 24. The memory 24 generates at its output a signal Sk indicative of a correction factor K corresponding to the difference d. The signal Sk is applied to a converter 26 which converts the signal Sk into a corresponding signal for application to the correcting circuit 12.

Figure 2:
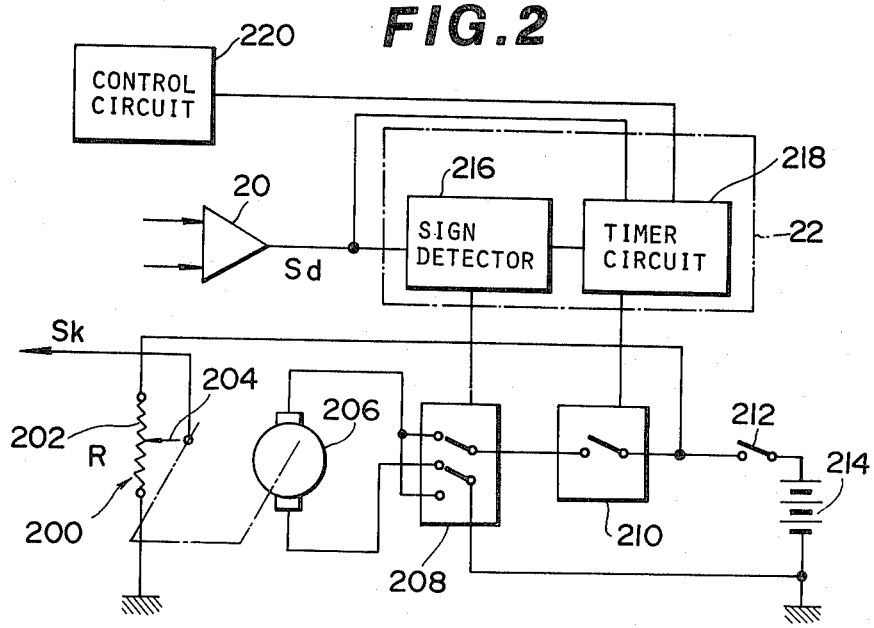
FIG. 2 is a block diagram showing the motor drive circuit used in the engine control system of FIG. 1.

Referring to FIG. 2, the memory 24 includes a potentiometer 200 which comprises a resistor 202 and a wiper 204 for sliding movement on the resistor 202 to tap off a resistance corresponding to the position of the wiper 204. The resistance 202 is connected at its opposite ends across a vehicle battery 214 through an engine key switch 212 so as to provide a voltage signal Sk corresponding to the tapped resistance between the ground and the wiper 204. Assuming now that the potentiometer resistance 202 has a total resistance of $10K\Omega$, as the potentiometer wiper 204 moves to cause a $1K\Omega$ change of the tapped resistance, the voltage signal Sk changes by $1 \cdot V$ volts, wherein V is the voltage of the vehicle battery 214. If the correction factor varies from zero to 10, a $1K\Omega$ change of the tapped resistance represents a change of the correction factor by a factor of 1. The wiper 204 is drivingly connected to a reversible motor 206 rotatable in one and reverse directions to cause the sliding movement of the wiper 204 on the resistor 202.

The reversible motor 206 is driven by the motor drive circuit 22 which includes a reversing switch 208 connected to the reversible motor 206. The revesing switch 208 is also connected to the vehicle battery 214 through a switch 210 and the engine key switch 212. The reversing switch 208 has two positions for changing the polarity of the voltage applied across the reversible motor 206 to change the direction of rotation of the reversible motor 206. The reversing switch 208 is associated with a sign detector 216 which detects the sign of polarity of the signal Sd from the comparator 20 and causes the reversing switch 208 to assure one of its positions in accordance with the detected sign. The switch 210 is associated with a timer circuit 218 which detects the magnitude d of the signal Sd from the comparator 20 and closes the switch 210 for a time corresponding to the detected magnitude d of the signal Sd.

Figure 3:
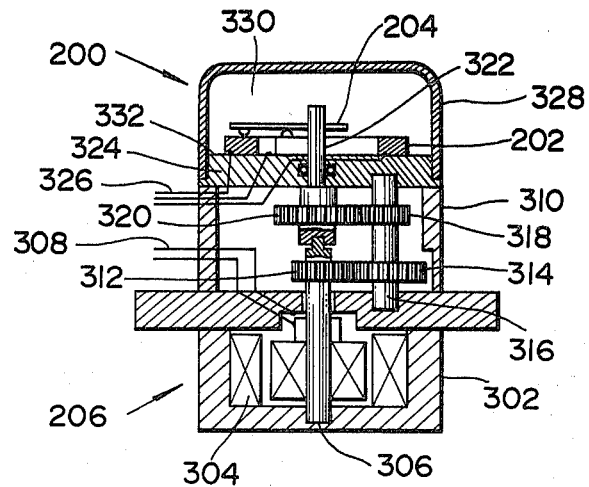
FIG. 3 is a sectional view showing the memory used in the engine control system of FIG. 1.

Referring to FIG. 3, the reversible motor 206 has a motor housing 302 containing therein a solenoid coil 304 which is connected through lines 308 to the reversing switch 208 (FIG. 2) for rotating a motor drive shaft 306 in a forward or reverse direction when energized. The rotation of the motor drive shaft 306 is transmitted to the potentiometer wiper 204 through a reduction gear unit 310 having a predetermined reduction gear ratio. The reduction gear unit 310 includes a gear 312 mounted on the motor drive shaft 306. The gear 312 meshes with a gear 314 secured on an auxiliary shaft 316 which has thereon another gear 318 meshing with a gear 320 secured on a wiper shaft 322 supported on the motor drive shaft 306 for free rotation thereon. The wiper shaft 22 extends outwardly through a base plate 324 placed on the motor housing 302. The wiper shaft 322 has thereon the wiper 204 in sliding contact with a semi-circular resistor 202 placed on the base plate 324. Lines 326 connect the opposite ends of the semi-circular resistor 202 across the vehicle battery 214 through the engine key switch 214 and the potentiometer wiper 204 to the converter 26 (FIG. 1). A cover 238 is placed on the base plate 324 to form a potentiometer chamber 330 containing therein the resistor 202 and the wiper 204.

The reduction geart unit 310 is effective to increase the torque to rotate the wiper shaft 322 and also to reduce the degree of rotation of the wiper shaft 222 for the same degree of rotation of the motor drive shaft 306. Assuming now that the reduction gear ratio is set at 1/30, every thirty degree of rotation of the motor drive shaft 306 causes the wiper shaft 322 to rotate one degree with a drive torque thirty times as great as that of the motor drive shaft 306. Thus, the reduction gear unit 310 permits the use of a small motor, such as for example, one used in wrist watches to drive the potentiometer wiper 204 and also fine control for the resistance of the potentiometer 200.

With the passage of time, the contact portions of the resistor 202 and the wiper 204 will get rusty and dusty, resulting in failure to effect correct correction-factor indication. This difficulty can be overcome by providing a seal 332 between the base plate 324 and the cover 328 to completely isolate the potentiometer chamber 330 from the exterior. It is preferable to seal, in the potentiometer chamber 330, a liquid anti-oxidant such as electrical insulating oil or a gaseous anti-oxidant such as nitrogen gas, argon gas, or other inert gases. It is also preferable to let air out of the potentiometer chamber 330 to reduce the pressure therein. In order to maintain proper electrical contact between the resistor 202 and the wiper 204, means may be provided to rotate the wiper 204, for example, for a second during engine resting, engine starting, or engine operation requiring on change of the correction factor stored in the memory.

If the sensed actual EGR rate value a is larger than the calculated target EGR rate value t over the allowble error range $\alpha$, the comparator 20 provides a positive signal having a magnitude d corresponding to the deviation between the actual and target values. The sign detector 216 places the reversing switch 208 in one position and the timer circuit 218 closes the switch 210 for a time corresponding to the absolute value of the magnitude d of the signal Sd so that the reversible motor 206 rotates in one direction causing the potentiometer wiper 204 to tap off an increased value of resistance. The tapped resistance and thus the voltage signal Sk indicate a correction factor K corresponding to the deviation between the actual and target EGR rate values. When the sensed actual EGR rate value a is smaller than the calculated target EGR rate value t over the allowable error range $\alpha$, the comparator 20 provides a negative signal having a magnitude d corresponding to the deviation between the actual and target EGR rate values. Te sign detector 216 changes the reversing switch 208 into another position and the timer circuit 218 closes the switch 210 for a time corresponding to the absolute value of the magnitude d of the signal Sd so that the reversible motor 206 rotates in another direction, causing the potentiometer wiper 204 to tap off a decreased value of resistance. If the deviation between the actual and target EGR ratio values is within the allowable error range, the comparator 20 provides no output. As a result, the reversible motor 206 remains stopped to maintain the tapped resistance and thus the signal Sk unchanged.

The motor drive circuit 22 may be designed to continuously rotates the reversible motor 206 in one or reverse direction until the signal Sd from the comparator 20 reaches zero if the condition to be controlled changes intermittently or its actual value can be sensed with high reliability. If the condition to be controlled changes with a relatively great dispersion and is difficult to be sensed with high reliability, it is preferable that the reversible motor 206 be a pulse motor and the motor drive circuit 22 be constructed to cause a small number of degrees, for example 30 degrees, of rotation of the reversible motor at a time so as to gradually bring the actual value close to the target value. This is true particularly when the present invention is applied to effect feedback control of the EGR rate, which varies slowly with the passage of time due to carbon accumulation in the EGR system and whose actual value is difficult to be sensoed with high reliability. For this purpose, a control circuit 220 may be provided which generates, at uniform intervals, pulses having a constant pulse width through the timer circuit 218 or directly to the switch 210.

Figure 4:
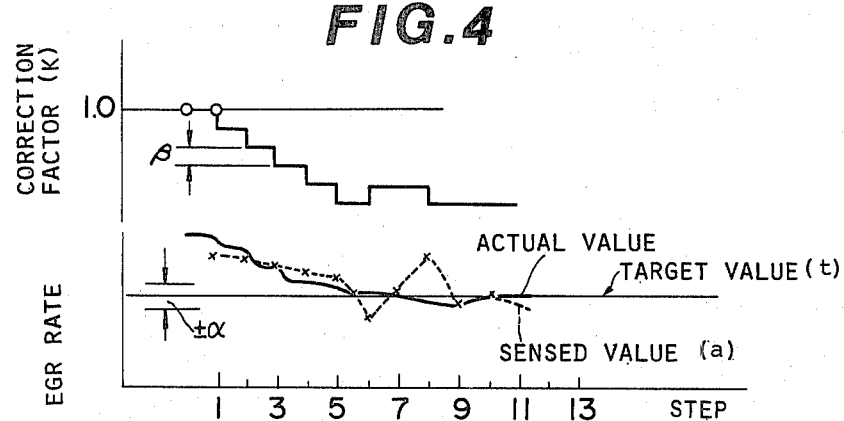
FIG. 4 includes two graphs used for explanation of the operation of the engine control system.

Referring to FIG. 4, the operation will be described in relation to the motor drive circuit 22 adapted to rotate the reversible step motor 206 in one or reverse direction by a predetermined number of degrees at a time so as to gradually bring the actual value close to the target value.

It is first assumed that an EGR rate error exists for any of reasons when the engine is assembled. If the EGR rate sensor 18 senses an EGR rate value greater than the calculated target value over the allowable error range $\alpha$ in the 1st step, the motor drive circuit 22 rotates the reversible motor 206 in one direction by a predetermined number of degrees to cause a predetermined amount $\beta$ of reduction of the correction factor K. This operation is repeated in the 2nd, 3rd, 4th and 5th steps as long as the sensed EGR rate value is still greater than the calculated target EGR rate value over the allowable error range $\alpha$. If, in the 6th step, the EGR rate sensor 18 senses an EGR rate value smaller than the target EGR rate value over the allowable error range $\alpha$, the motor drive circuit 22 rotates the reversible motor 206 in the reverse direction by the predetermined number of degrees to cause the predetermined amount $\beta$ of increase of the correction factor K. If, in the 7th step, the difference between the sensed and target EGR rate values is within the allowble error range, the motor drive circuit 22 does not rotate the reversible motor 206 so that the correction factor K is maintained at the same value as obtained in the previous step 6th. Even if, in the 8th step, a great dispersion appears in the EGR rate measurement for any of reasons, the motor drive circuit 22 rotates the reversible motor 206 only by the predetermined number of degrees. If, in the 9th, 10th and 11th steps, the difference between the snesed and target EGR rate values is held within the allowable error range, the reversible motor 206 is maintained stopped and the correction factor K is maintained unchanged.

Figure 5:
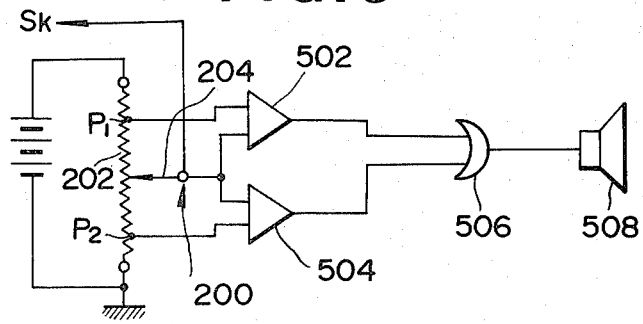
FIG. 5 is a block diagram showing an alarm circuit for use with the engine control system of the present invention.

Referring to FIG. 5, there is illustrated an alarm circuit 500 for providing an alarm when the correction factor K stored in the memory 24 is larger than an upper limit or smaller than a lower limit so as to indicate an abnormal condition in the EGR rate sensor, EGR-valve actuator, or other system components. The alarm circuit 500 includes first and second comparators 502 and 504. The first comparator 502 has an input connected to the potentiometer wiper 204 and another input connected to the potentiometer resistor 202 at a point P1 tapping off a resistance corresponding to the correction factor upper limit. The first comparator 502 provides an alarm signal to one input of an OR circuit 506 when the wiper 204 moves upwardly in view of FIG. 5 over the point P1 or when the correctio factor K increases over the upper limit. The second comparator 504 has an input connected to the potentiometer wiper 204 and another input connected to the potentiometer resistor 202 at a point P2 tapping off a resistance corresponding to the correction factor lower limit. The second comparator 504 provides an alarm signal to another input of the OR circuit 506 when the wiper 204 moves downwardly in view of FIG. 5 over the point P2 or when the correction factor K decreases over the lower limit. Accordingly, an alarm signal is applied through the OR circuit 506 to a buzzer 508 which thereby operates to inform an abnormal condition in the EGR rate sensor, EGR-valve actuator, or other system components. Assuming that the potentiometer resistor 202 has a total resistance of $10K\Omega$, the another inputs of the first and second comparators 502 and 504 may be connected to the potentiometer resistor 202 at points tapping off $9K\Omega$ and $1K\Omega$ resistances, respectively.

While the invention has been described in connection with EGR rate control, it is understood that the invention could readily be applied to control other controlled-variables such as fuel-injection timing, ignition-system spark-timing, and the like.

There has been provided, in accordance with the present invention, an engine control system having a memory which includes a potentiometer and a reversible motor drivingly connected to the potentiometer for moving the potentiometer wiper to tap off a resistance corresponding to a value to be stored in the memory. Accordingly, the stored value can be maintained after the memory is separated from a source of power.

While the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An engine control system responsive to engine operating parameters for determining a target value of setting of at least one controlled variable to obtain an optimum value of a condition for effecting a predetermined function of an internal combustion engine, said engine control system including a sensor associated with said engine for sensing an actual value of said condition, a comparator for detecting a difference between said actual value and said optimum value, a memory for storing a correction factor corresponding to said detected difference, and means for correcting said target value for said stored correction factor, said memory comprising:

(a) a potentiometer having a resistor and a wiper movable in sliding contact with said resistor;

(b) a reversible motor drivingly connected to said potentiometer wiper for moving said wiper on said resistor; and (c) a motor drive circuit for rotating said reversible motor in one or reverse direction in accordance with said detected difference so as to permit said wiper to tap off a resistance corresponding to said detected difference.

2. The engine control system of claim 1, wherein said motor drive circuit is adapted to rotate said reversible motor in one direction when said detected difference is positive and in the reverse direction when said detected difference is negative.

3. The engine control system of claim 1, wherein said motor drive circuit is adapted to rotate said reversible motor in one direction when said detected difference is a positive value larger than a predetermined positive value and in the reverse direction when said detected difference is a negative value smaller than a predetermined negative value.

4. The engine control system of claim 2 or 3, wherein said motor drive circuit is adapted to rotate said reversible motor an angle corresponding to the absolute value of said detected difference.

5. The engine control system of claim 2 or 3, wherein said motor drive circuit is adapted to rotate said reversible motor by a predetermined number of degrees at intervals.

6. The engine control system of claim 1, which comprises an alarm circuit for informing an abnormal condition when said correction factor is larger than an upper limit or smaller than a lower limit.

7. The engine control system of claim 6, wherein said alarm circuit comprises:

a first comparator having an input connected to said wiper and another input connected to said resistor at a first point tapping off a resistance corresponding to said upper limit for providing an alarm signal when said wiper moves over said first point to increase said correction factor over said upper limit;

a second comparator having an input connected to said wiper and another input connected to said resistor at a second point tapping off a resistance corresponding to said lower limit for providing an alarm signal when said wiper moves over said second point to decrease said correction factor over said lower limit; and means responsive to said alarm signal from said first or second comparator for providing an alarm.

8. An engine control system for use with an intrnal combustion engine including an EGR device for recirculating engine exhaust gases to combustion chambers of said engine, said engine control system being responsive to engine operating parameters for determining a target value of EGR rate and controlling said EGR device to achieve EGR rate of said target value, said engine control system including a sensor associated with said EGR device for sensing an actual value of EGR rate, a comparator for detecting a difference between said actual and target EGR rate values, a memory for storing a correction factor corresponding to said detected difference, and means for connecting said target EGR rate value for said stored correction factor, said memory comprising:

(a) a potentiometer having a resistor and a wiper movable in sliding contact with said resistor;

(b) a reversible motor drivingly connected to said potentiometer wiper for moving said wiper on said resistor; and (c) a motor drive circuit for rotating said reversible motor in one or reverse direction in accordance with said detected difference so as to permit said wiper to tap off a resistance corresponding to said detected difference.

9. The engine control system of claim 8, wherein said comparator is adapted to provide a deviation signal, the magnitude of which is zero when said detected difference is within an allowable error range having predetermined upper and lower limits and corresponds to said detected difference when said detected difference is out of said allowable error range, said deviation signal having a positive sign when said detected difference is above said upper limit and a negative sign when said detected difference is below said low limit.

10. The engine control system of claim 9, wherein said motor drive circuit is adapted to rotate said reversible motor in one direction when said detected said deviation signal has a positive sign and in the reverse direction when said deviation signal has a negative sign.

11. The engine control system of claim 10, wherein said motor drive circuit comprises a reversing switch having first and second positions, said reversing switch connecting said reversible motor in a polarity to a source of power at said first position, said reversing switch connecting said reversible motor in the reverse polarity to said power source, and a sign detector responsive to the sign of said deviation signal from said comparator for changing the position of said reversing switch.

12. The engine control system of claim 9, wherein said motor drive circuit is adapted to rotate said reversible motor an angle corresponding to the magnitude of said diviation signal.

13. The engine control system of claim 12, wherein said motor drive circuit comprises a switch for connecting said reversible motor to a source of power when closed, and means for closing said switch for a time corresponding to the magnitude of said deviation signal.

14. The engine control system of claim 9, wherein said motor drive circuit is adapted to rotate said reversible motor by a predetermined number of degrees at intervals.

15. The engine control system of claim 14, wherein said motor drive circuit comprises means for generating pulses having a constant pulse width, and a switch responsive to said pulses for closing to connect said reversible motor to a source of power for a time corresponding to the pulse width of said pulses.

16. The engine control system of claim 8, which comprises an alarm circuit for informing an abnormal condition when said correction factor is larger than an upper limit or smaller than a lower limit.

17. The engine control system of claim 16, wherein said alarm circuit comprises:

a first comparator having an input connected to said wiper and another input connected to said resistor at a first point tapping off a resistance corresponding to said upper limit for providing an alarm signal when said wiper moves over said first point to increase said correction factor over said upper limit;

a second comparator having an input connected to said wiper and another input connected to said resistor at a second point tapping off a resistance corresponding to said lower limit for providing an alarm signal when said wiper moves over said second point to decrease said correction factor over said lower limit; and means responsive to said alarm signal from said first or second comparator for providing an alarm.

* * * * *